United States Patent [19]

Swenson

[11] 4,029,284

[45] June 14, 1977

[54] SEAT SUPPORT ASSEMBLY FOR A RECREATIONAL VEHICLE

[75] Inventor: Richard F. Swenson, Milwaukee, Wis.

[73] Assignee: Milsco Manufacturing Company, Milwaukee, Wis.

[22] Filed: Mar. 12, 1976

[21] Appl. No.: 666,492

[52] U.S. Cl. .............................. 248/399; 248/421; 297/209

[51] Int. Cl.² .................. A45D 19/04; F16M 13/00

[58] Field of Search .......................... 248/372–385, 248/399, 400, 421, 423; 297/195, 203, 209, 243, DIG. 9

[56] References Cited

UNITED STATES PATENTS

| | | | |
|---|---|---|---|
| 2,452,280 | 10/1948 | Zahller | 248/399 UX |
| 3,006,593 | 10/1961 | Plate et al. | 248/399 UX |
| 3,319,920 | 5/1967 | Freedman et al. | 248/399 |

FOREIGN PATENTS OR APPLICATIONS

| | | | |
|---|---|---|---|
| 624,171 | 7/1927 | France | 248/378 |
| 199,714 | 12/1923 | United Kingdom | 297/209 |
| 508,279 | 6/1939 | United Kingdom | 297/209 |

*Primary Examiner*—Lawrence J. Staab
*Attorney, Agent, or Firm*—James E. Nilles

[57] ABSTRACT

A seat supporting assembly for use in recreational vehicles such as motorcycles or the like. The seat supporting assembly includes a plurality of pivotable arms extending between the vehicle frame and the vehicle seat for supporting the seat for generally linear vertical movement and further includes a spring assembly resiliently supporting the seat. The spring assembly can be pivotably moved to a plurality of varied inclined positions to permit adjustment of the resilient effect of the spring assembly to compensate for riders of different weights.

9 Claims, 5 Drawing Figures

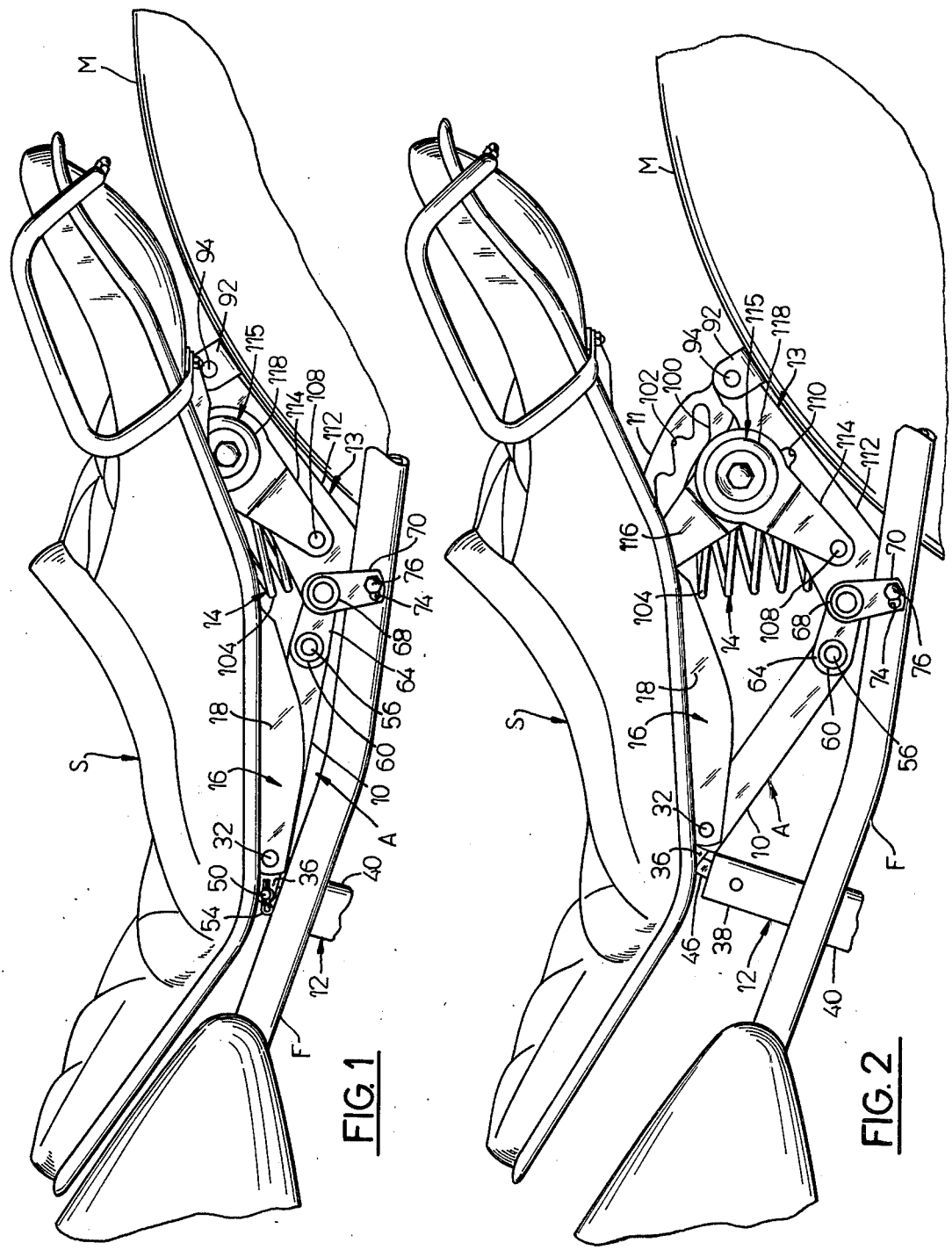

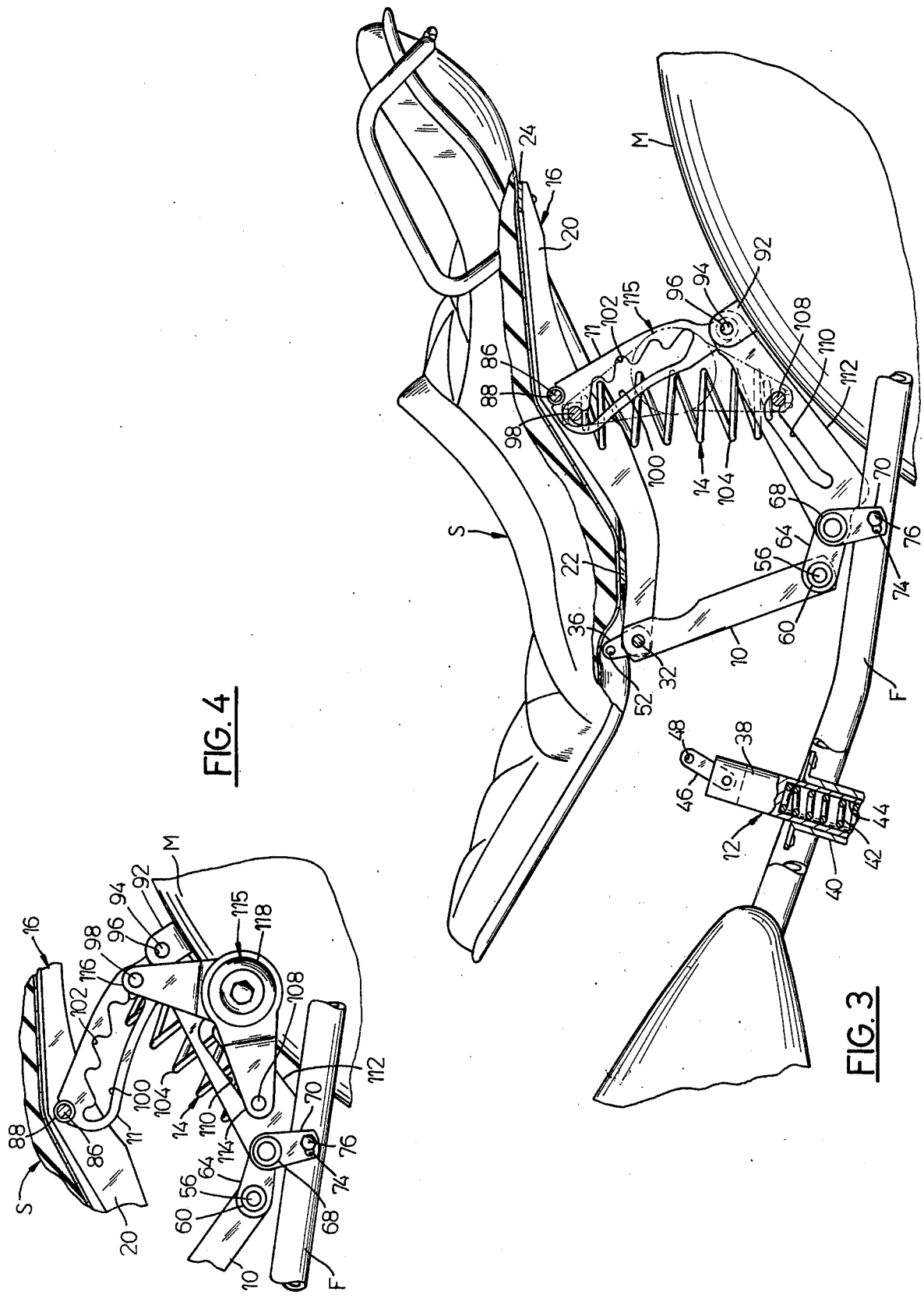

4,029,284

SEAT SUPPORT ASSEMBLY FOR A RECREATIONAL VEHICLE

BACKGROUND OF THE INVENTION

The present invention relates to seat supporting assemblies which provide resilient support for seats used in recreational vehicles, motorcycles and the like.

In many of the prior art recreational vehicles such as motorcycles, the vehicle seat is rigidly supported by the vehicle frame and the only resilient support for the driver is provided by the seat per se, i.e., the springs provided within the seat. This arrangement is often inadequate to provide a sufficiently smooth ride.

Some other prior art motorcycles have provided resilient means for supporting the seat but these arrangements have also proved to have drawbacks. For example, a well known method of resiliently supporting a seat includes mounting the seat on the rearward end of a cantilevered generally horizontally extending bracket. The forward end of the bracket is pivotally mounted to the vehicle frame and the bracket is supported intermediate its length by a vertically extending coil spring assembly which serves to provide resilient support for the seat. Several drawbacks are inherent in such a system. For example, since the seat is pivotable about a pivot point located in front of the seat, during vertical oscillation of the seat, the rear portion of the seat will have greater vertical movement than the forward part of the seat. This drawback is accentuated in the event that the seat is sufficiently long to comfortably support two riders. If the seat is supported such that the forward portion of the seat has a sufficient vertical movement to provide a comfortable ride for the driver, the rear portion will have an undesirable amplitude of movement.

A further failure of the prior art is that no convenient means has been provided to effectively adjust the resiliency of the springs supporting the seat. The prior art has provided auxiliary supporting devices which can be added to support the seat but these devices are not adjustable to compensate for any variations in the weight of riders and passengers, and they are usually not conveniently added or removed. Thus, none of the prior art devices have provided a convenient and readily adjustable means for regulating the resilient effect of the springs to compensate for riders of different weights or two riders rather than just one.

SUMMARY OF THE INVENTION

The present invention provides a seat supporting assembly for recreational vehicles, motorcycles and the like which includes a seat support structure facilitating substantially uniform vertical movement of the forward and rearward portions of the seat and providing adjustable resilient seat supporting means which provide convenient adjustment for riders of different weights or the addition of a second rider.

The seat supporting assembly generally comprises a plurality of substantially parallel pivotable arms positioned beneath the seat and pivotable about pivot points located beneath the seat thereby supporting the seat for substantially uniform vertical movement. The seat supporting assembly also includes a damping means to control vertical movement of the seat and a spring assembly for resiliently supporting the seat and being pivotably supported at its lower end such that it can be moved to any of a plurality of positions varying from a vertical position to a substantially rearwardly inclined position. In the vertical position, the spring assembly will provide firm but resilient support for the seat whereas, when the spring assembly is in a substantially inclined position, the spring will have less mechanical advantage and will provide a softer ride.

A particular advantage of the seat supporting assembly of the present invention is that the seat is supported such that the front and rear portions of the seat move substantially the same distance. As a result, the vehicle can be provided with a longer seat than was previously feasible thereby providing increased comfort for the riders when two riders are positioned on the seat.

Another significant advantage of the seat supporting assembly is that the spring assembly supporting the rear portion of the seat can be conveniently adjusted so as to provide additional resilient support for a second rider or to compensate for riders of different weights.

Though the seat supporting assembly described herein is shown as being used for supporting a motorcycle seat, it should be readily apparent that the present invention is equally useful for supporting a similar seat on any type of recreational vehicle.

BRIEF DESCRIPTION OF THE DRAWINGS

FIG. 1 is a side view of a motorcycle seat supported by a seat supporting assembly of the present invention.

FIG. 2 is a view similar to that shown in FIG. 1 but showing the motorcycle seat in a higher position.

FIG. 3 is a view similar to FIGS. 1 and 2 but having portions cut away in the interest of clarity and showing the motorcycle seat in its uppermost position.

FIG. 4 is a partial view of the structure shown in FIG. 3 but showing the rear spring assembly, supporting the rearward portion of the motorcycle seat, in a more rearwardly inclined position.

DESCRIPTION OF THE PREFERRED EMBODIMENT

Figure 5:
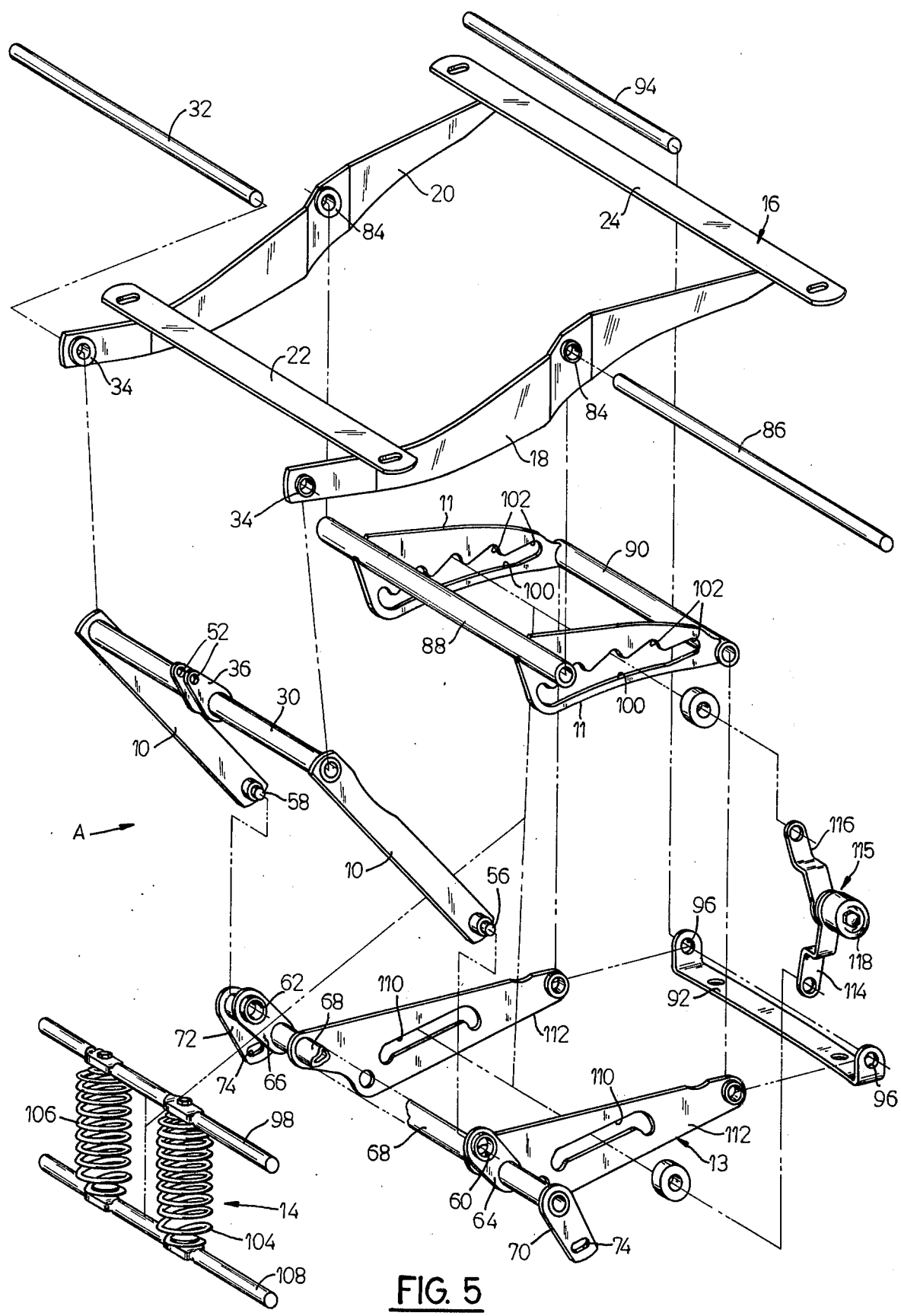
FIG. 5 is an exploded isometric view of some of the structural elements of the seat support assembly of the present invention and shown in FIGS. 1–4.

FIGS. 1–3 illustrate the seat supporting assembly A of the present invention shown resiliently supporting a motorcycle seat S. The seat supporting assembly A is generally comprised of a substantially parallel link assembly comprised of pairs of pivotable arms 10 and 11 extending between the seat S and a rigid frame assembly 13, secured to the motorcycle M, to provide support for the seat S and to restrict the movement of the seat S to vertical movement. The seat supporting assembly further includes a rear spring assembly 14, functioning to provide resilient support for the seat S. The embodiment of the invention shown in the drawings also includes a front spring assembly 12, though in other embodiments, the front spring assembly 12 may not be necessary.

The motorcycle seat S is directly supported by a rigid seat support frame 16 (FIG. 5) comprised of a pair of curved longitudinally extending frame members 18 and 20 and laterally extending front and rear seat supporting bars 22 and 24, respectively, rigidly connected at their opposite ends to the frame members 18 and 20. As shown in FIG. 2, the forward end of the rigid seat support frame 16 is supported by the forward spring assembly 12 and by the pair of laterally spaced and forwardly inclined pivotable arms 10. The upper ends of the arms 10 include bores for receiving the opposite ends of a transversely extending tube 30 whereby the tube 30 can be rigidly supported by the ends of the arms 10. A shaft 32 is received through the tube 30 and is also received through bushings 34 positioned in bores in the forward ends of the seat supporting frame members 18 and 20. The tube 30 also supports a pair of closely spaced upwardly and forwardly extending mounting brackets 36 designed to permit attachment of the upper end of the forward spring assembly 12.

As best shown in FIG. 3, the forward spring assembly 12 is generally comprised of a partially hollow inner cylindrical shaft 38 slideably received within an outer hollow shaft 40 which is welded to the frame F of the motorcycle M. The hollow inner shaft 38 includes a coil spring 42 within a bore 44 therein. The coil spring 42 is rigidly supported at its lower end (not shown), and its upper end is received against the end of the bore 44. The hollow inner shaft 38 is thus resiliently supported for axially reciprocable movement within the outer shaft 40. A link 46 is pivotably attached to the upper end of the hollow inner shaft 38 and includes a bore 48 in its upper end for receiving a removable pin 50 (FIG. 1) which is also received through bores 52 in the brackets 36. The forward end of the seat S is thus supported by the forward spring assembly 12. It should be noted that the pin 50 can be removed to permit the seat to be raised to the position shown in FIG. 3 to thereby facilitate maintenance and the like. In order to prevent inadvertent removal of the pin 50, however, a locking key 54 is received through a bore in the pin 50.

The pair of pivotable arms 10 are forwardly inclined and are pivotably supported at their lower ends by the frame assembly 13. More specifically, the lower ends of the pivotable arms 10 include pivot pins 56 and 58 received within aligned bushings 60 and 62 supported in the upwardly extending ends of the rigidly supported links 64 and 66. The links 64 and 66 are rigidly attached to and supported by a laterally extending tube 68. The tube 68 is supported at its opposite ends by supporting links 70 and 72. As shown in FIGS. 1-3, the supporting links 70 and 72 are bolted to the frame F of the motorcycle M. In order to permit proper alignment or adjustment of the position of the tube 68, the supporting links 70 and 72 include slots 74 for receiving bolts 76.

The seat supporting frame assembly 16 is also supported by the pair of laterally spaced rear pivotable arms 11 and by the rear spring assembly 14. The pair of rear pivotable arms 11 are connected to the seat supporting frame 16 at a point intermediate its length where the seat supporting frame members 18 and 20 each house bushings 84 which receive opposite ends of a shaft 86. The shaft 86 is received through a tube 88 rigidly attached at positions adjacent to its ends to the pivotable arms 11. The lower ends of the pivotable arms 11 are each rigidly connected to opposite ends of a laterally extending tube 90 which is in turn pivotably connected to a fender bracket 92 of the frame assembly 13 by means of a shaft 94 which extends through bores 96 at opposite ends of the fender bracket and through the tube 90. The fender bracket 92 is securely bolted to the fender of the motorcycle M.

The pair of spaced parallel pivotable arms 11 each include a longitudinally extending slot 100 therein for receiving opposite ends of a transverse shaft 98 of the rear spring assembly 14. The slots 100 each include a plurality of notches 102 such that the shaft 98 can be releaseably and adjustably positioned at a plurality of positions.

The rear spring assembly 14 is comprised of a pair of generally vertically extending parallel coil springs 104 and 106 secured at one end to the transverse shaft 98 and secured at their other end to a lower transverse shaft 108. The lower transverse shaft 108 is slideably received at its opposite ends in slots 110 disposed in a pair of parallel spaced support brackets 112 of the rigid frame assembly 13. The support brackets 112 each include a bushing in their rearward end whereby they can be rigidly supported by the shaft 94 and the fender bracket 92. The forward end of each of the support brackets is rigidly supported by the tube 68.

FIGS. 1 and 2 best illustrate two of the normal operating positions of the seat supporting assembly referred to above. FIG. 1 illustrates the position of the seat if substantial weight had been applied to the seat and FIG. 2 illustrates the position of the seat S in an upper position. As also shown in FIGS. 1 and 2, the seat supporting assembly of the present invention also includes a damping assembly 115 disposed on one side of the seat supporting assembly and connecting the support bracket 112 and the arms 11 to dampen movement of the pivotal arms 11 and thus restrict vertical oscillation of the seat S. The damping assembly 115 includes a lower pivotable linkage 114 pivotably connected to one end of the lower transverse shaft 108 and is thus slideably supported by the slot 110 of the support bracket 112. The damping assembly 115 further includes an upper pivotable linkage 16 pivotably connected to the shaft 98 of the rear spring assembly 14 and thus supported for movement along slot 100. The pivotable linkages 114 and 116 are mutually joined by a conventional friction damping means 118 of a type which retard relative pivotal movement of the linkages 114 and 116, to thus retard vertical movement of the seat in a variable manner as adjustments are made for different weight riders, to provide a smooth and comfortable ride. The friction damping means 118 could also be replaced with any other similar commercially available conventional damping means such as oil-air dampers or viscous dampers.

The shaft 98 joining the upper ends of the coil springs 104 and 106 is movable in the slots 100 to be received in any of the plurality of notches 102 such that the rear spring assembly 14 can be variably positioned. FIG. 2 illustrates the spring assembly 14 positioned such that the coil springs 104 and 106 are substantially vertical whereby the springs will provide a relatively firm ride and support substantial weight. With the springs in this relative position, the seat supporting assembly can easily compensate for the weight of both a rider and passenger. If, on the other hand, the seat is to support less weight and/or a softer ride is to be provided, the shaft 98 can be moved to a more rearward notch (FIG. 4) such that the springs 104 and 106 will be rearwardly inclined and have less mechanical advantage so as to provide less resilient support for the seat.

In the event it is desirable to obtain access to components of the motorcycle positioned beneath the seat S, the pin 50 can be removed to release the seat from the front spring and the shaft 108 can be moved rearwardly within the slots 110 as shown in FIG. 3. The seat S can thus be elevated to a convenient position as shown therein to facilitate maintenance or the like.

RESUME

The seat supporting assembly of the present invention thus provides a means for supporting the seat of a recreational vehicle such as a motorcycle or the like and which provides a generally uniform vertical reciprocation of the seat and which provides convenient readily accessible means for adjusting the amount of resilient support for the seat to permit compensating for a second rider or riders of different weights. The invention also facilitates the use of a damping assembly whereby the vertical acceleration of the seat can be controlled to thereby provide a smoother and more comfortable ride for the vehicle operator. The seat supporting assembly also specifically provides means for raising the seat to a position which facilitates maintenance of the vehicle.

I claim:

1. A seat supporting assembly for use in a recreational vehicle to resiliently support a seat, said seat supporting assembly comprising:

at least a pair of spaced apart pivotable arms, including a forward arm and a rearward arm, each of said arms including an upper end pivotably connected to said seat and a lower end pivotably connectable to said vehicle, said arms each being inclined forwardly and upwardly and supporting said seat for generally vertical movement, and said rearward arm including a longitudinally extending slot therein; and a spring assembly for resiliently supporting said seat and including a lower end pivotably supportable by said vehicle intermediate said lower ends of said forward arm and said rearward arm, and including an upper end shiftably supported by said longitudinal slot wherein said spring assembly is moveable between a substantially vertical position wherein said seat is resiliently supported by said spring assembly to a position wherein said spring extends rearwardly and wherein said upper end of said spring assembly is received adjacent to said lower end of said rearward arm wherein the resilient support of said seat by said spring assembly is reduced, a second spring assembly rigidly supportable by said vehicle, said seat including a forward end and a rearward end, said second spring assembly being connected to said forward end of said seat for resiliently supporting said forward end.

2. The seat supporting assembly set forth in claim 1 wherein said longitudinal slot includes a plurality of notches for releaseably receiving said upper end of said spring assembly.

3. The seat supporting assembly set forth in claim 1 further including a supporting frame securable to said vehicle, and wherein said pivotable arms are pivotably connected to said frame and supported by said frame, and wherein said frame includes a slot for slideably supporting said lower end of said spring assembly for movement in forward and rearward directions.

4. The seat supporting assembly set forth in claim 1 further including a damping assembly for restricting vertical movement of said seat, said damping assembly including opposite ends, one of said ends being connectable to said vehicle and the other of said ends being connected to said rearward arm, said damping assembly including a pair of pivotably connected linkages, said linkages being pivotably joined and including means for damping relative pivotal movement of said linkages therebetween.

5. A seat supporting assembly for use in a motorcycle to resiliently support a seat, said seat supporting assembly comprising:

a supporting frame rigidly securable to said motorcycle;

at least a pair of spaced apart pivotable arms, including a forward arm and a rearward arm, each of said arms including an upper end pivotably connected to said frame, said arms each being inclined forwardly and upwardly and supporting said seat for generally vertical movement, and said rearward arm including a longitudinally extending slot therein;

a spring assembly for resiliently supporting said seat and including a lower end pivotably supported by said frame intermediate said lower ends of said forward arm and said rearward arm, and including an upper end shiftably supported by said longitudinal slot wherein said spring assembly is movable between a substantially vertical position wherein said seat is resiliently supported by said spring assembly to a position wherein said spring extends rearwardly and wherein said upper end of said spring assembly is received adjacent to said lower end of said rearward arm wherein the resilient support of said seat by said spring assembly is reduced, and a second spring assembly rigidly supported by said motorcycle, said seat including a forward end and a rearward end, said second spring assembly being releasably connected to said forward end for resiliently supporting said forward end.

6. The seat supporting assembly set forth in claim 5 wherein said longitudinal slot includes a plurality of notches for releaseably receiving said upper end of said spring assembly.

7. The seat supporting assembly set forth in claim 5 wherein said frame includes means for slideably supporting said lower end of said spring assembly for movement in forward and rearward directions.

8. The seat supporting assembly set forth in claim 5 further including a damping assembly operably connected between said frame and said seat for restricting vertical movement of said seat.

9. The seat supporting assembly set forth in claim 8 wherein said damping assembly includes a pair of pivotably connected linkages, one of said linkages being pivotably supported by said frame and the other of said linkages being operably connected to said spring assembly, said linkages being pivotably joined and including means for damping relative pivotal movement of said linkages.

* * * * *